United States Patent [19]

Schott et al.

[11] Patent Number: 5,107,961

[45] Date of Patent: Apr. 28, 1992

[54] FIXTURE FOR A CABLE LUBRICATING DEVICE

[75] Inventors: Roger A. Schott; Lawrence A. Schott, both of Detroit, Mich.

[73] Assignee: Freedom Industries, Inc., Redford, Mich.

[21] Appl. No.: 675,408

[22] Filed: Mar. 26, 1991

[51] Int. Cl.$^5$ .............................................. F16N 11/00
[52] U.S. Cl. ................................ 184/15.1; 184/105.1; 118/404
[58] Field of Search ............... 184/15.1, 15.3, 16, 184/102, 105.1; 118/404, 405

[56] References Cited

U.S. PATENT DOCUMENTS

| | | | |
|---|---|---|---|
| 2,578,260 | 12/1951 | McPherson et al. | 184/15.1 |
| 3,283,854 | 11/1966 | Self | 118/404 |
| 3,828,890 | 8/1974 | Schott et al. | 184/15.1 |
| 3,889,781 | 6/1975 | Schott et al. | 184/15.1 |

Primary Examiner—Allen M. Ostrager
Assistant Examiner—Alan B. Cariaso
Attorney, Agent, or Firm—Barnes, Kisselle, Raisch, Choate, Whittemore & Hulbert

[57] ABSTRACT

A fixture facilitating the lubrication of cables including a housing having a clamping portion and a resilient insert to receive and capture the elongate cable and the end of the cable sheath, the compressible material being clamped around these portions. A valved lubricant aperture is provided in the fixture for introducing lubricant under pressure to the cable sheath while preventing blowback of the pressurized lubricant. The compressible insert in the fixture is designed to be captured in the base of one portion of the fixture and at another point in the moving portion of the fixture to allow it to be opened and closed for insertion and removal of the cable and sheath.

3 Claims, 1 Drawing Sheet

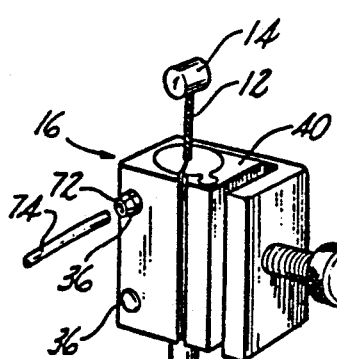
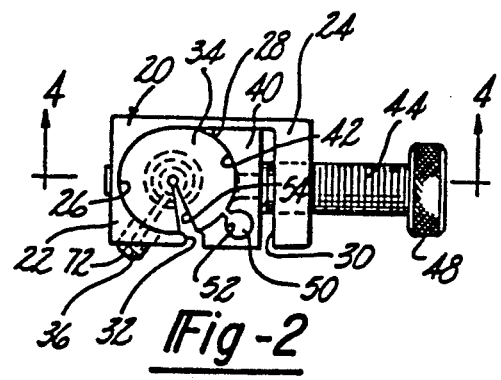
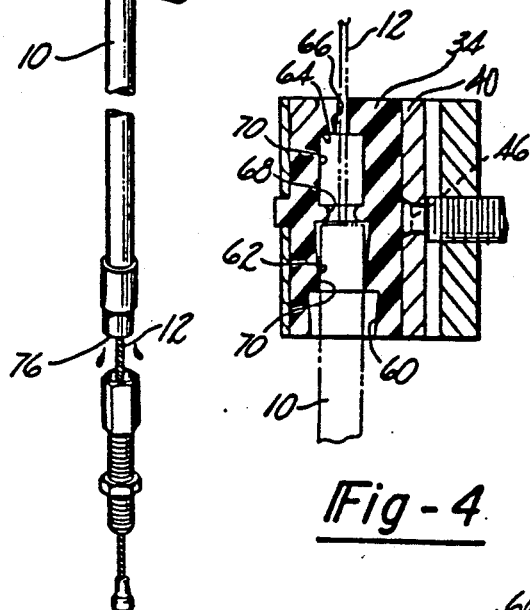
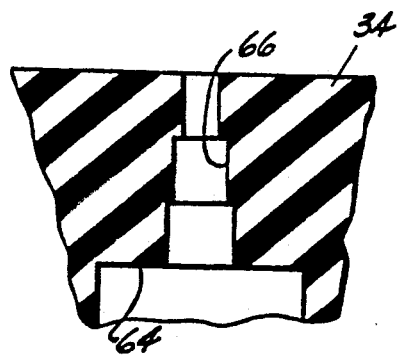
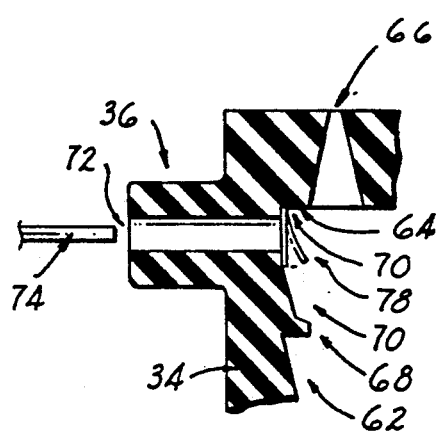

FIXTURE FOR A CABLE LUBRICATING DEVICE

FIELD OF THE INVENTION

Fixture for cable lubricating devices especially for motorcycles and bicycles.

BACKGROUND AND FEATURES OF THE INVENTION

This invention relates to a Fixture for a Cable Lubricating Device. Reference is made to U.S. Pat. No. 3,889,781 (Jun. 17, 1975) entitled "Cable Lubricating Device."

The present invention has as its object the improvement of a fixture for clamping on to the cable and sheath.

It is an object of the present invention to provide a clamping enclosure for a sheath and a cable which can be opened up to receive the elements to be lubricated and then clamped down to provide a closed receptacle for the receipt of lubricant under pressure.

It is a further object to provide a relatively inexpensive lubricating fixture in which the clamping material has a resilient characteristic and is fastened to movable portions of the fixture in such a way that it will open and close with a manual adjustment It is a further object to provide for a cable lubricating device which will allow the controlled receipt of lubricant under pressure.

Other objects and features of the invention relate to details of the design and will be apparent in the following description and claims in which the principles of the invention are set forth together with the manner of use in the best mode presently contemplated

BRIEF DESCRIPTION OF THE DRAWINGS

DRAWINGS accompany the disclosure and the various views thereof may be briefly described as:

FIG. 1, a perspective view of the fixture in assembled position;

FIG. 2, an end view of the fixture;

FIG. 3, a side view of the fixture;

FIG. 4, a sectional view on line 4—4 of FIG. 2;

FIG. 5, an enlarged view of the small opening of the compressible insert; and

FIG. 6, an enlarged view of the opening in the radial protrusion of the compressible insert.

DETAILED DESCRIPTION OF THE INVENTION AND THE MANNER AND PROCESS OF USING IT

With reference to the drawings, in FIG. 1 there is shown a cable sheath 10 which houses a cable 12. The cable may have a fastening lug 14 securely affixed to the end thereof. A fixture 16 is used to capture the end of the sheath and the cable for lubricating purposes. An end view of this fixture is shown in FIG. 2 in which it will be seen that there is an extrusion part forming a body 20 which has a base portion 22 and a capping portion 24.

An internal recess extending through the body terminates in a semi-circular or cylindrical recess 26 at the bottom with a side wall 28 at the back and a top wall 30 at the top. The front of the one body opens to the recess at 32. Seated in the semi-circular portion of the recess is a resilient cylindrical element 34 formed of a compressible oil resistant material relatively soft in nature.

The cylindrical element 34 has two spaced radial protrusions 36 which pass through holes 38 in the forward portion of the body base 22 extending at an angle as illustrated in FIG. 2. These protrusions serve to capture the lower portion of the element in the body. Slidably mounted in the recess within the body 20 is a clamping plate 40 which has a semicircular curvature on the side 42 which faces the recess and a flat top portion parallel with the surface 30. A headed screw 44 is threaded through the capping portion 24 and has a small projection 46 which is loosely riveted in an opening in the clamp portion 40. This projection will rotate in this clamp so that when the screw is operated by its knurled head 48, the clamp portion 40 will move in the recess of the body 20. The cylindrical portion 34 is formed with an axially extending rib 50 which is retained in an opening 52 in the clamp portion 40 to capture the upper portion of the element. The clamp 40 is stabilized and guided by the back wall 28 of the body as it moves to and from in the recess.

The cylindrical element 34 has an axially extending radial cleavage 54 to an axial bore or cavity within the cylindrical portion Thus, it will be seen that with one portion of the cylindrical insert 34 captured by the protrusions 36 in the base of the body and another portion of the cylindrical element captured in the recess 52, the motion of the clamping element 40 will cause the resilient member to open and close at the radial cleavage 54. The recess within the compressible element 34 is progressively enlarged axially with two sections 60 and 62 each terminating at a shoulder and entering at one end and terminating at a wall 64, there being a small axial opening 66 at the central portion of the wall 64.

Sections 60 and 62 progressively increase in diameter to a shoulder portion and are connected by a neck portion 68 to the final recess 70. Thus, when a cable sheath 10 is inserted into the side cleavage, it will, depending on its size, fit readily against a shoulder of one of the sections 60,62 and the cable 12 will pass through the small opening 66. Thus, when the clamp element 40 is moved downwardly by the screw 44, the cylindrical element 34 will seal around the sheath at, for example, the point 70 as shown in FIG. 4, and the small opening 66 will seal around the cable 12. One of the protrusions 36 has an opening 72 which leads into the recess portion 70. The opening 72 is covered by a flap of resilient material 78 that is attached to the surface of the final recess portion 70 near the wall 64 as shown in FIG. 6. When the parts are assembled as shown in FIG. 1, a small tube or wand 74 can be inserted in the opening 72 and lubricant under pressure can be introduced into the chamber 70 where it will flow around the cable and into the end of the sheath 10. Continued introduction will cause the lubricant to flow out of the other end of the cable at 76. When finished lubricating the cable, the small tube 74 is removed from the opening 72 and the flap of resilient material 78 will seal opening 72, thereby preventing pressurized lubricant blowback out the opening 72.

Thus, it will be seen that a cable end, together with the sheath end, can be easily introduced into the fixture after which it can be sealed by the clamping action of the parts and lubricant introduced to flow through the cable sheath around the cable to lubricate the connecting surfaces The release of the screw 44 will cause an opening of the radial cleavage 54 and permit ready removal of the parts after lubrication

What is claimed is:

1. A fixture for a cable lubricating device which comprises:
   (a) a body portion having a base, a side wall, and a cap portion defining a top and an internal recess having a curved portion at the base and a relatively flat portion at the top, said recess opening at one side, and one or more locator openings extending radially from said recess,
   (b) a resilient insert to lie in said recess against the base having a projection to interfit with a locator opening, said insert having a central bore extending axially thereof to receive the end of a cable sheath and a cable, and an axially extending radial cleavage to said bore,
   (c) a clamping plate in said recess opposite said curved portion to move in said recess toward and away from said insert,
   (d) means to move said plate to compress said insert and close said insert around said sheath and cable and said projection on said insert being perforated to permit insertion of a lubricant pressure tube, said perforation leading to said central bore, said perforation containing check valve means for preventing pressurized lubricant backflow.

2. A fixture as defined in claim 1 in which check valve means comprises a flexible resilient flap attached to said central bore covering said perforation.

3. A fixture as defined in claim 1 in which said perforated projection has a generally cylindrical passage extending through said projection to said central bore for receiving said lubricant pressure tube and enabling the passage of lubricant to said central bore, an entry of said cylindrical passage entry into said central bore covered by a flap of flexible, resilient material to enable pressurized lubricant to flow one way into said central bore, thereby preventing said lubricant backflow.

* * * * *